United States Patent
Gittinger et al.

(10) Patent No.: US 6,327,640 B1
(45) Date of Patent: *Dec. 4, 2001

(54) OVERLAPPING PERIPHERAL CHIP SELECT SPACE WITH DRAM ON A MICROCONTROLLER WITH AN INTEGRATED DRAM CONTROLLER

(75) Inventors: Robert Paul Gittinger; Ronald W. Stence; John P. Hansen; Wade Williams, all of Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/813,728

(22) Filed: Mar. 7, 1997

(51) Int. Cl.$^7$ .................................................. G06F 12/06
(52) U.S. Cl. ......................... 711/105; 711/172; 711/169; 711/158
(58) Field of Search ................................. 711/202, 209, 711/105, 104, 169, 203, 211, 118, 122, 100, 201, 106, 173, 172, 170, 158; 395/846, 842

(56) References Cited

U.S. PATENT DOCUMENTS

| Re. 36,482 | * | 1/2000 | Baba | 711/211 |
|---|---|---|---|---|
| 4,316,248 | * | 2/1982 | Retter | 714/22 |
| 4,330,823 | * | 5/1982 | Retter | 712/248 |
| 4,675,808 | | 6/1987 | Grinn et al. | 364/200 |
| 4,811,204 | * | 3/1989 | Fung | 710/40 |
| 5,265,231 | | 11/1993 | Nuwayser | 395/425 |
| 5,276,812 | | 1/1994 | Yamada et al. | 395/275 |
| 5,276,833 | * | 1/1994 | Auvinen et al. | 711/105 |
| 5,276,858 | | 1/1994 | Oak et al. | 395/550 |
| 5,301,328 | * | 4/1994 | Begur et al. | 711/201 |
| 5,309,568 | * | 5/1994 | Ghosh et al. | 710/129 |
| 5,386,547 | * | 1/1995 | Jouppi | 711/122 |
| 5,420,995 | | 5/1995 | Taguri | 395/425 |
| 5,469,559 | * | 11/1995 | Parks et al. | 711/106 |
| 5,522,062 | * | 5/1996 | Yamaki | 711/172 |
| 5,530,837 | * | 6/1996 | Williams et al. | 711/157 |
| 5,535,169 | | 7/1996 | Endo et al. | 365/230.03 |
| 5,559,992 | * | 9/1996 | Stutz et al. | 711/163 |
| 5,590,078 | | 12/1996 | Chatter | 365/189.01 |

(List continued on next page.)

OTHER PUBLICATIONS

Advanced Micro Devices, "Am186™EM and AM188™EM User's Manual with Am186 Instruction Definitions", 1995, pp. 1–1 thru 1–6; 2–1 thru 2–9; 3–1 thru 3–18; 4–1 thru 4–9; 5–1 thru 5–12; 6–1 thru 6–2; 7–1 thru 7–35; and 12–1 thru 12–6.

Advanced Micro Devices, "Am186™EM and AM188™EM High–Performance, 80C186– and 80C188–Compatible, 16–Bit Embedded Microcontrollers", 1996, pp. 29–48, 52–68, and 93–96.

Advanced Micro Devices, "Am186™ES and AM188™ES High–Performance, 80C186– and 80C188–Compatible, 16–Bit Embedded Microcontrollers", 1996, pp. 24–52, and 65–75.

Primary Examiner—Matthew Kim
Assistant Examiner—Pierre-Michael Bataille
(74) Attorney, Agent, or Firm—Zagorin, O'Brien & Graham, LLP

(57) ABSTRACT

A peripheral device selected with a chip select is mapped onto address space occupied by DRAM without causing internal or external contentions. A first address range is provided for accessing DRAM. A second address range is provided for accessing another device. The second address range is within the first address range. A row address strobe is provided for accesses within both the first and second address ranges but the column address strobe to the DRAM is inhibited when a memory access occurs within the second address range.

17 Claims, 10 Drawing Sheets

U.S. PATENT DOCUMENTS

| | | | |
|---|---|---|---|
| 5,623,638 | | 4/1997 | Andrade .................................. 395/494 |
| 5,634,112 | | 5/1997 | Thome et al. ........................ 395/481 |
| 5,636,367 | | 6/1997 | Stones et al. ........................ 395/494 |
| 5,638,528 | * | 6/1997 | Gay et al. ............................. 711/217 |
| 5,649,161 | | 7/1997 | Andrade et al. ...................... 395/494 |
| 5,664,168 | * | 9/1997 | Yishay et al. ........................ 713/600 |
| 5,668,815 | * | 9/1997 | Gittinger et al. .................... 714/719 |
| 5,706,407 | * | 1/1998 | Nakamura et al. ................... 711/172 |
| 5,724,604 | * | 3/1998 | Moyer ..................................... 712/43 |
| 5,737,744 | * | 4/1998 | Callison et al. ..................... 711/114 |
| 5,748,977 | | 5/1998 | Kawasaki et al. ................... 395/800 |
| 5,751,645 | * | 5/1998 | Tsukikawa ........................... 365/194 |
| 5,781,492 | * | 7/1998 | Gittinger et al. ............... 365/230.01 |
| 5,787,291 | * | 7/1998 | Moyer et al. ........................ 713/200 |
| 5,822,768 | | 10/1998 | Shakkarwar ........................ 711/149 |
| 5,860,129 | * | 1/1999 | Moyer et al. ........................ 713/500 |
| 5,862,148 | * | 1/1999 | Typaldos et al. .................... 714/724 |
| 5,875,451 | * | 2/1999 | Joseph .................................. 711/105 |
| 5,878,268 | * | 3/1999 | Hagersten ............................. 712/28 |
| 5,937,170 | * | 8/1999 | Bedarida .............................. 711/202 |
| 5,987,579 | * | 11/1999 | Nishtala et al. ..................... 711/169 |

* cited by examiner

| 15 | | 7 | | | | | | 0 |
|---|---|---|---|---|---|---|---|---|
| 1 | M6–M0 | | EX | MS | 1 | 1 | 1 | R2 | R1–R0 |

FIG. 4a

| 15 | | 7 | | | | | 0 |
|---|---|---|---|---|---|---|---|
| | BA19–BA11 | | 1 | 1 | 1 | R3 | R2 | R1–R0 |

FIG. 4b

| $\overline{PCS}$ Pins | Address Range | |
|---|---|---|
| | Low | High |
| $\overline{PCS}$ 0 | Base Address | Base Address+255 |
| $\overline{PCS}$ 1 | Base Address+256 | Base Address+511 |
| $\overline{PCS}$ 2 | Base Address+512 | Base Address+767 |
| $\overline{PCS}$ 3 | Base Address+768 | Base Address+1023 |
| Reserved | N/A | N/A |
| $\overline{PCS}$ 5 | Base Address+1280 | Base Address+1535 |
| $\overline{PCS}$ 6 | Base Address+1536 | Base Address+1791 |

FIG. 4c

| R3 | R1 | R0 | Wait States |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 5 |
| 1 | 0 | 1 | 7 |
| 1 | 1 | 0 | 9 |
| 1 | 1 | 1 | 15 |

FIG. 4d

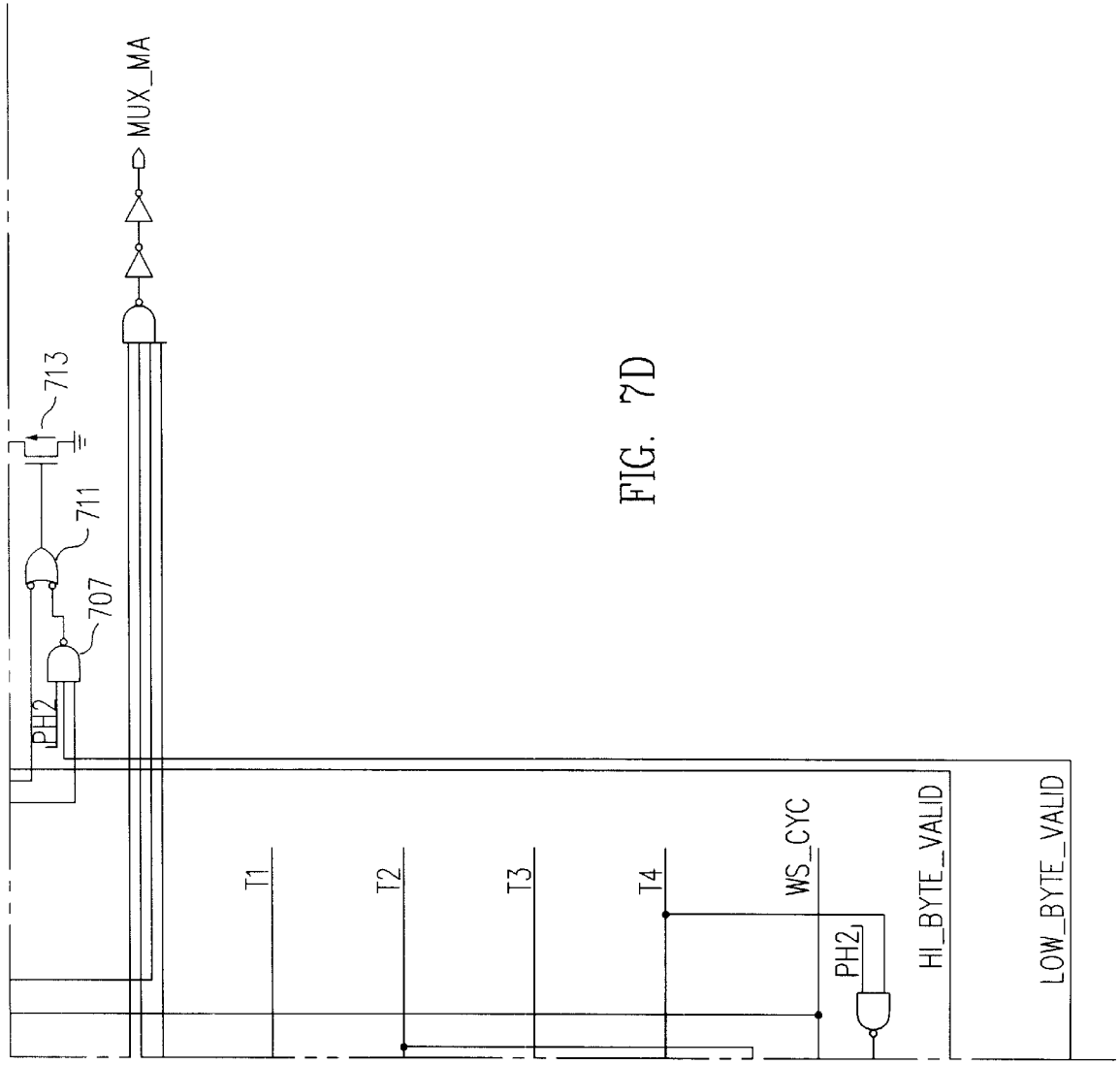

OVERLAPPING PERIPHERAL CHIP SELECT SPACE WITH DRAM ON A MICROCONTROLLER WITH AN INTEGRATED DRAM CONTROLLER

CROSS-REFERENCE TO RELATED APPLICATIONS

This application relates to the following co-pending applications, Ser. No. 08/813/727, entitled "A METHOD AND APPARATUS FOR BANKING ADDRESSES FOR DRAMS", by Hansen et al., now U.S. Pat. No. 5,909,703 Ser. No. 08/813,734, entitled "A METHOD AND APPARATUS FOR ADDRESS MULTIPLEXING TO SUPPORT VARIABLE DRAM SIZES", by Hansen et al., now U.S. Pat. No. 6,016,537; and Ser. No. 08/813,726, entitled "INTEGRATING A DRAM CONTROLLER ONTO A MICROCONTROLLER", by Gittinger et. al., now U.S. Pat. No. 5,966,736 all of which were filed the same day as the present application and all of which are incorporated herein by reference.

BACKGROUND OF THE INVENTION

1. Field of the Invention

This invention relates to computers and more particularly to addressing of computer peripherals and memories.

2. Description of the Related Art

In a typical microcontroller design, various chip select signals are available that indicate that an address is within a particular address range and can be used to select a particular device. An example of such a microcontroller is the AM186™ES which is compatible with the 80186 microcontroller. Details of one example of a '186 microcontroller can be found in the Advanced Micro Devices data sheets for the AM186™ES (Publication #20002; Rev. A; Amendment/0; Issue Date: January 1996), the Am186™EM and Am188™EM (Publication #19168 Rev. D Amendment /0; Issue Date: January 1996) and the "Am186™EM/188™EM/188™EMUser's Manual with Am 186 Family Instruction Definitions, " which are incorporated herein by reference.

In the AM186™ES, the available chip selects include an upper memory chip select (UCS). UCS is used for the upper address space and in the AM186™ES has a block size varying from 64 Kbytes to 512 Kbytes and an ending address of FFFFFh. A lower memory chip select (LCS) indicates an address in the lower memory region with a starting address of 00000h In the AM186™ES, the block size for LCS can range from 64 Kbytes to 512 Kbytes. Midrange chip selects with programmable starting addresses and block sizes are also available. The peripheral chip selects (PCS) provide additional capability to select peripheral devices and they can be programmed to reside anywhere in the 1 Mbyte address space of the '186. The block size of the peripheral chip selects is small relative to LCS and UCS and can be e.g., 256 bytes.

However, PCS address space in typical '186 microcontrollers is mutually exclusive with the address space of other chip selects such as LCS or UCS. Thus, if PCS is mapped into the lower or upper address space, large amounts of address space is lost. For example, if PCS is mapped into a 256 byte block starting at address 40000h, then the maximum memory size for LCS is 256 Kbytes (0 to 3FFFF). The address space from 40000-7FFFF can not be used for LCS. Thus, a 256 byte address space for LCS caused the sacrifice of almost 256 Kbytes of address space.

In prior '186 microcontrollers, if PCS address space was overlapped with a UCS (or LCS) address space, several unwanted things could take place. Referring to FIG. 1, two devices, such as UCS device 101 and PCS device 103 could try to drive bus 107 simultaneously for a read operation. Further, the devices may have different ready and wait state requirements. Thus, the UCS device may have zero wait states and the PCS device could have 3 wait states. When a chip select (such as PCS, LCS or UCS) is decoded to be active, in some microcontroller implementations, assertion of the chip select causes its ready and wait state programming to be placed onto an internal bus within the microcontroller. If two chip selects are decoded in the same space, the ready and wait states of both devices will drive on the internal bus causing contention and unpredictable behavior.

It would be desirable to overlay PCS address space over LCS or UCS address space without sacrificing large portions of the address space and without causing undesirable and unpredictable results.

SUMMARY OF THE INVENTION

Accordingly, the invention provides a method and apparatus to map a peripheral device selected with a chip select onto address space occupied by DRAM without causing internal or external contentions. Specifically, the invention provides a method which provides a first address range for accessing DRAM. A second address range is provided for accessing another device. The second address range is within the first address range. A row address strobe is provided for accesses to both the first and second address range but the column address strobe to the DRAM is inhibited when a memory access occurs to the second address range.

The invention also provides apparatus including a circuit which receives a first indication signal that is asserted when the address is in a first address range indicating a DRAM access. The circuit also receives a second indication signal that is asserted when the address is in a second address range indicating an access to a peripheral device. The second address range is within the first address range. The circuit provides a column address strobe according to the first indication signal. An inhibiting circuit receives the second indication signal and inhibits assertion of the column address strobe when the second indication signal is asserted. The inhibiting circuit prevents multiple devices driving external buses on read operations. Further, a priority resolution circuit provides priority to the second indication signal for retrieval of communication protocols programming internal to the processor, thus preventing unpredictable contention on internal buses.

BRIEF DESCRIPTION OF THE DRAWINGS

The present invention may be better understood, and its numerous objects, features, and advantages made apparent to those skilled in the art by referencing the accompanying drawings, wherein, the use of the same reference symbols in different drawings indicates similar or identical items.

FIG. 4a shows the PCS and MCS Auxiliary Register.

FIG. 4b shows the Peripheral Chip Select Register.

FIG. 4c shows a table for PCS address range.

FIG. 4d shows ready and wait state programming.

DESCRIPTION OF THE PREFERRED EMBODIMENT(S)

Figure 1:
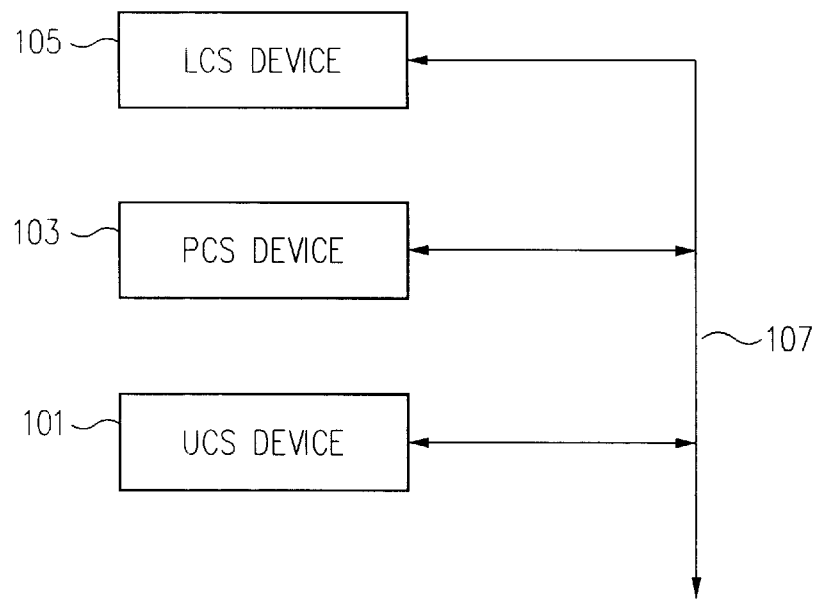
FIG. 1 shows an LCS, UCS and PCS device coupled to a bus.
Figure 2:
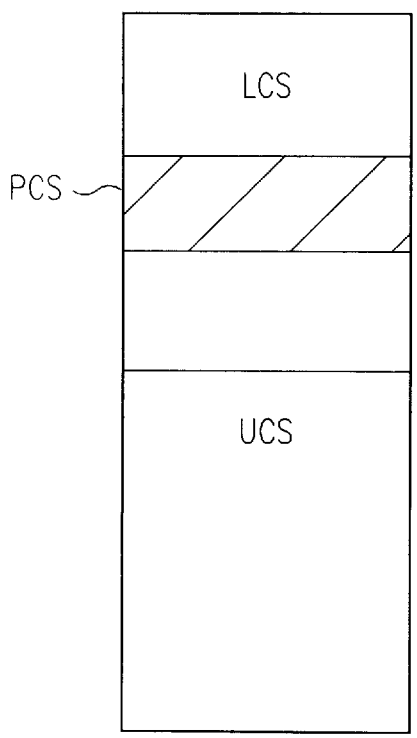
FIG. 2 shows an overlay of PCS address space onto LCS address space.
Figure 3:
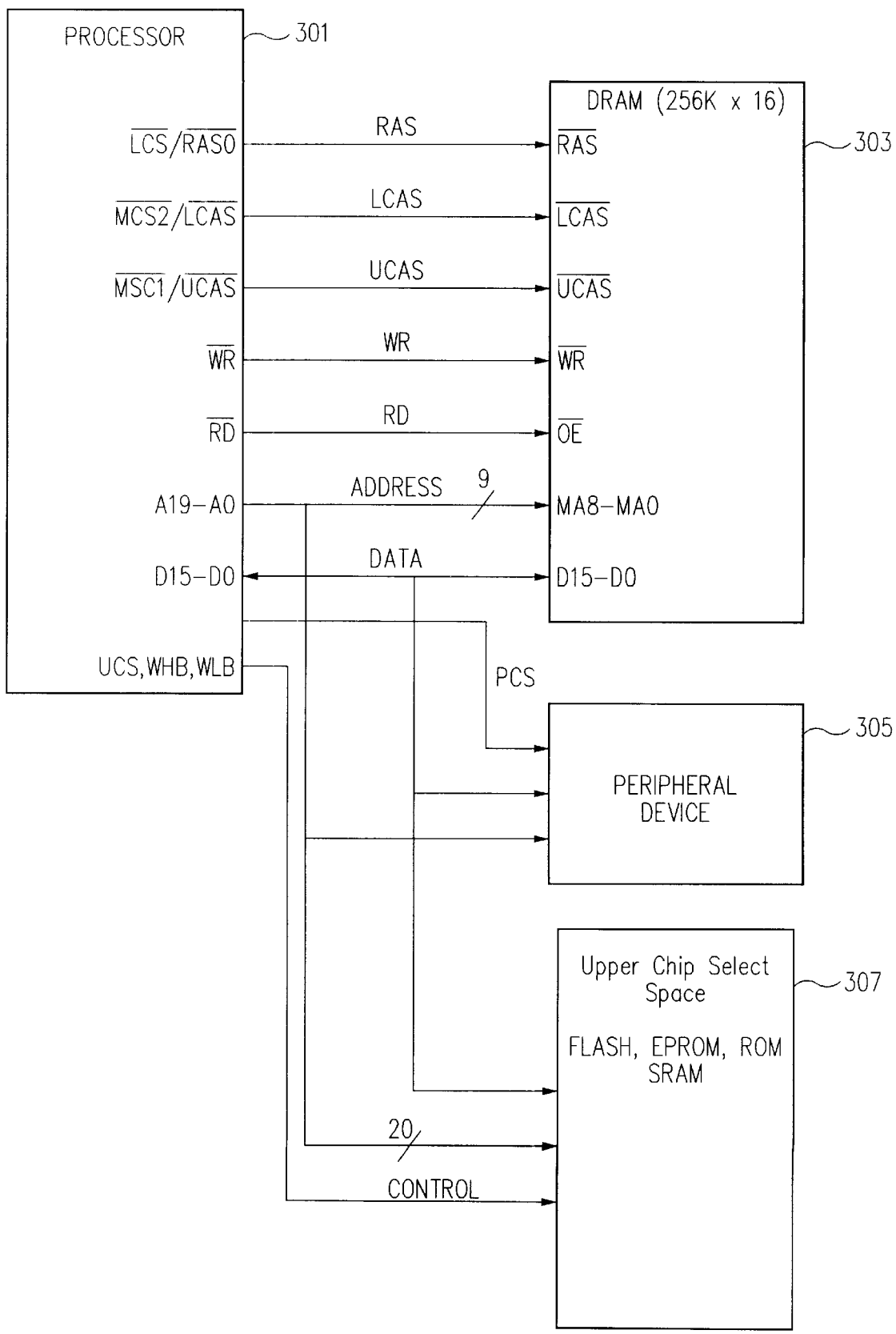
FIG. 3 shows an implementation of the invention using a '186 processor.

In a microcontroller that incorporates a DRAM controller using the present invention, it is possible to overlap PCS and DRAM address space. FIG. 2 shows conceptually a PCS device mapped onto the same address space in which LCS is mapped. FIG. 3 shows an example of a system according to the present invention implementing the overlay of PCS onto LCS address space of FIG. 2. Processor 301 incorporates a DRAM controller so that it provides row address strobes (RAS) and column address strobes (CAS) and other appropriate control signals to DRAM 303. For one preferred embodiment of a '186 microcontroller incorporating a DRAM controller, LCS is converted to a RAS signal, the middle chip selects MCS1 and MCS2 are converted to upper and lower CAS signals (UCAS and LCAS). An example of the appropriate RAS/CAS timing for typical read/write operations for the embedded DRAM controller is shown in FIGS. 4a and 4b. DRAM is selected by writing a specific bit in the upper or lower memory chip select register. In one preferred embodiment, that bit is bit 6 of the upper and lower memory chip select register (Upper (Lower) Address DRAM enable (UDEN (LDEN))).

Referring again to FIG. 3, the example assumes that the block size of the DRAM is 512 Kbytes with a starting address at 0 and an ending address of 7FFFFh and that PCS is mapped into an LCS address space. Thus, a portion of the 512 Kbyte memory locations are overlayed by peripheral device 305.

In the '186, the PCS's are programmed by writing two registers. The first is the PCS and MCS Auxiliary Register which is shown in FIG. 4a. The bits relevant to the PCS signals are as follows. Bit 7 (Pin Selector EX)) bit determines whether the PCS6–PCS5 pins are configured as chip selects or as alternate outputs for A2–A1. When this bit is set to 1, PCS6–PCS5 are configured as peripheral chip select pins. When EX is set to 0, PCS5 becomes address bit A1 and PCS6 becomes address bit A2. Bit 6 (Memory I/O Space Selector (MS)) determines whether the PCS pins are active during memory bus cycles or I/O bus cycles. When MS is set to 1, the PCS outputs are active for memory bus cycles. When MS is set to 0, the PCS outputs are active for I/O bus cycles. Bits 5-3 are reserved and set to 1. Bit 2 (Ready Mode (R2)) applies only to the PCS6–PCS5 chip selects. If R2 is set to 0, external ready is required. If R2 is set to 1, external ready is ignored. In each case, the processor also uses the value of the R1–R0 bits to determine the number of wait-states to insert. Bits 1–0, (Wait-State Value (R1–R0)) apply only to the PCS6–PCS5 chip selects. The value of R1–R0 determines the number of wait-states inserted into an access to the PCS memory or I/O area. From zero to three wait-states can be inserted (R1–R0=00b to 11b).

The second register is the Peripheral Chip Select Register shown in FIG. 4b. In that register the 9 MSBs (bits 15-7) are used for the base address, the four LSBs are designated R3, R2, R1 and R0. The base address of the PCS signals can be configured anywhere in the 1 Mbyte memory in the AM186™EM and AM186ES. When a DRAM controller is included in the microcontroller address FFFFFh is reserved for refresh in one preferred embodiment The block size of each PCS is fixed at 256 bytes. The base address of the PCS is based on the 9 bits described earlier and also according to which PCS (of several available) is selected as shown in FIG. 4c. Thus, the address range of a PCS is determined using the nine most significant bits in the Peripheral Chip Select Register plus the offset indicated in FIG. 4b, plus 255 bytes.

The R2 bit configures the ready mode for the PCS chip selects indicating whether the processor should wait for an external ready signal before continuing access. When R2 is set to 1 external ready mode is ignored. When R2 is set to 0, external ready is required. The remaining bits R3, R1 and R0 program the wait states as shown in FIG. 4d indicating how many additional delay cycles the processor should insert before continuing an access sequence.

Additional details on programming the ready and wait states for the '186 microcontroller can be found in the Am186™EM/188™EM User's Manual and the Am186™EM, Am188™EM and Am186™ES data sheets mentioned previously.

Figure 5A:
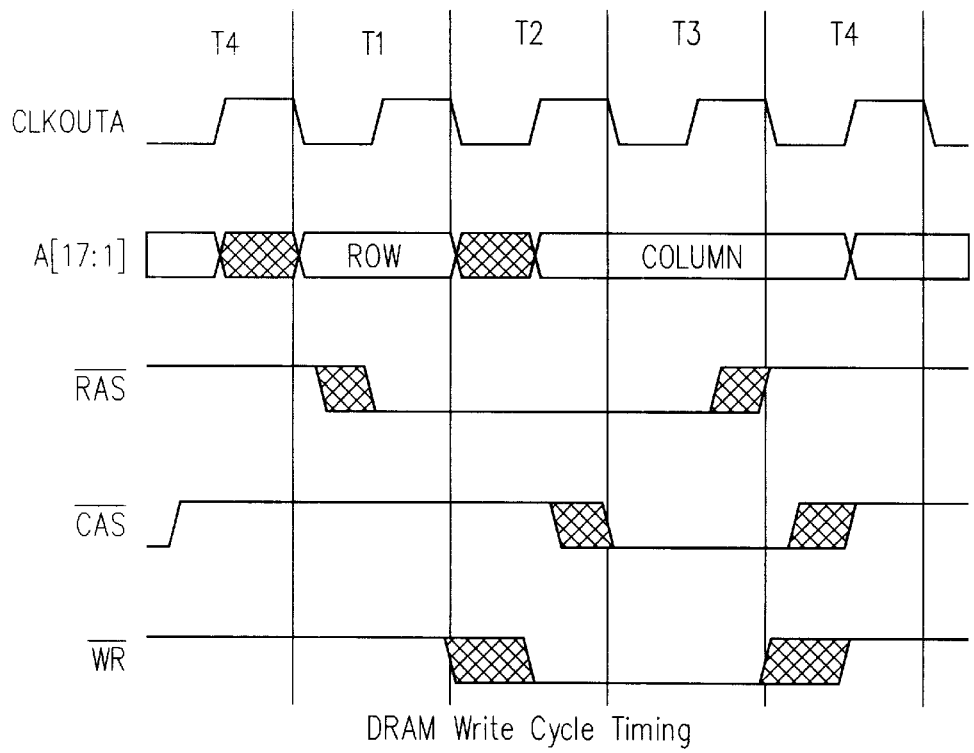
FIG. 5a shows timing for a DRAM write cycle.
Figure 5B:
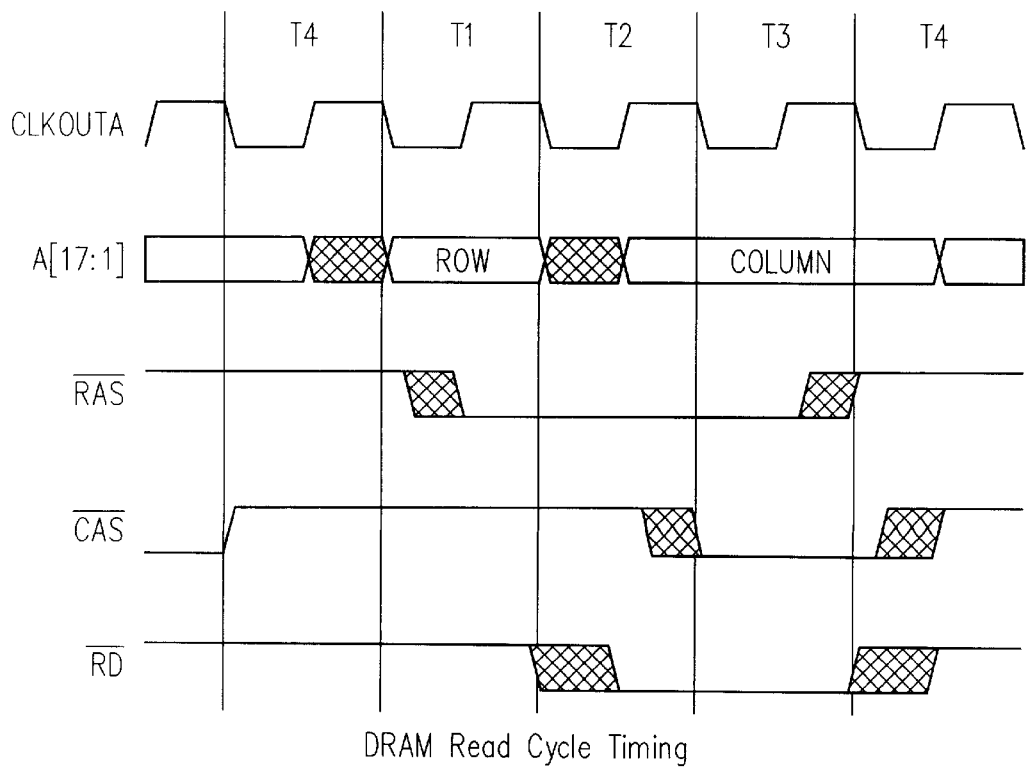
FIG. 5b shows timing for a DRAM read cycle.
Figure 6A:
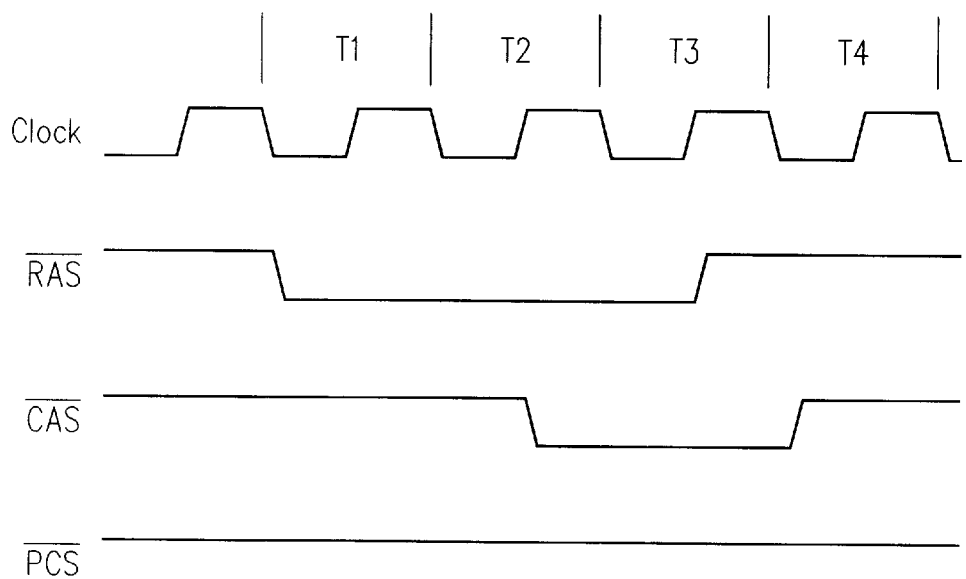
FIG. 6a shows a normal DRAM row address without PCS active
Figure 6B:
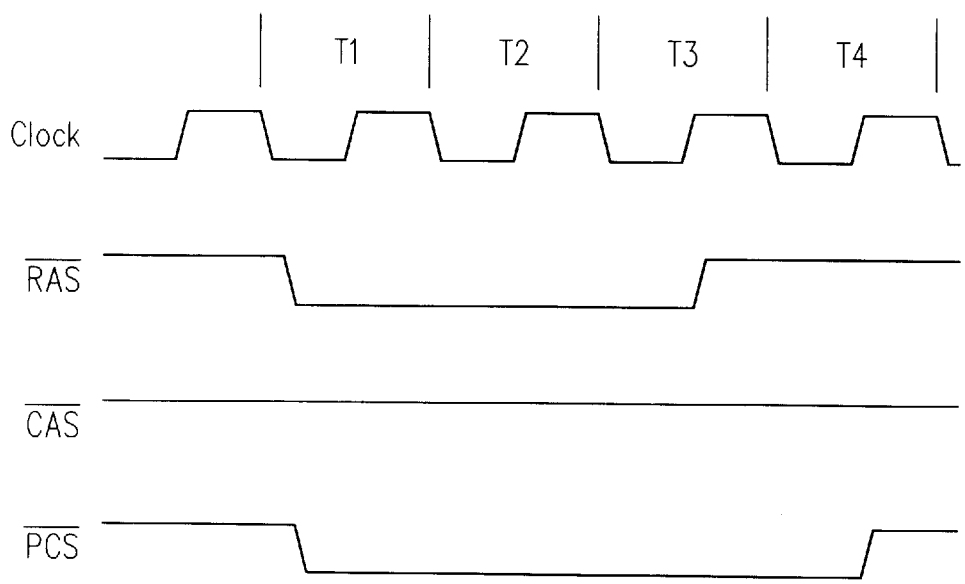
FIG. 6b shows a DRAM access with a PCS active and CAS inhibited.

In FIG. 3, assume that PCS0 is selected with a base address of 40000h. Thus, the address range for peripheral device 305 is 40000h to 400FH and the DRAM has an address range of 0 to 7FFFFh. The address range of the peripheral device is a subset of the address range of the DRAM. A write or read access to an address within the DRAM address range but outside of the address range of peripheral device 305, will cause $\overline{RAS}$ and $\overline{CAS}$ to be asserted for a write or read as shown in FIGS. 5a and 5b. FIG. 6a shows a DRAM access with PCS not being asserted. When an access does occur to an address within the address range of peripheral device 305, then PCS is asserted by the microcontroller. When PCS is asserted, access to the DRAM is prevented by inhibiting the assertion of $\overline{CAS}$ as shown in FIG. 6b. Thus, if an access occurs to an address that is within the address range of the DRAM but also within the address range of peripheral device 305, i.e., in the example discussed, an address of 40000h to 400FH, then the access to the DRAM located in the LCS space will start normally with an assertion of $\overline{RAS}$ as shown in FIG. 6a, but will not complete. The invention takes advantage of the fact that providing a DRAM with a $\overline{RAS}$ signal without a $\overline{CAS}$ signal is non-destructive. That prevents the DRAM from responding to the memory access, thus guaranteeing that the peripheral device selected by PCS will be the only device to respond to the memory access.

Figure 7A:
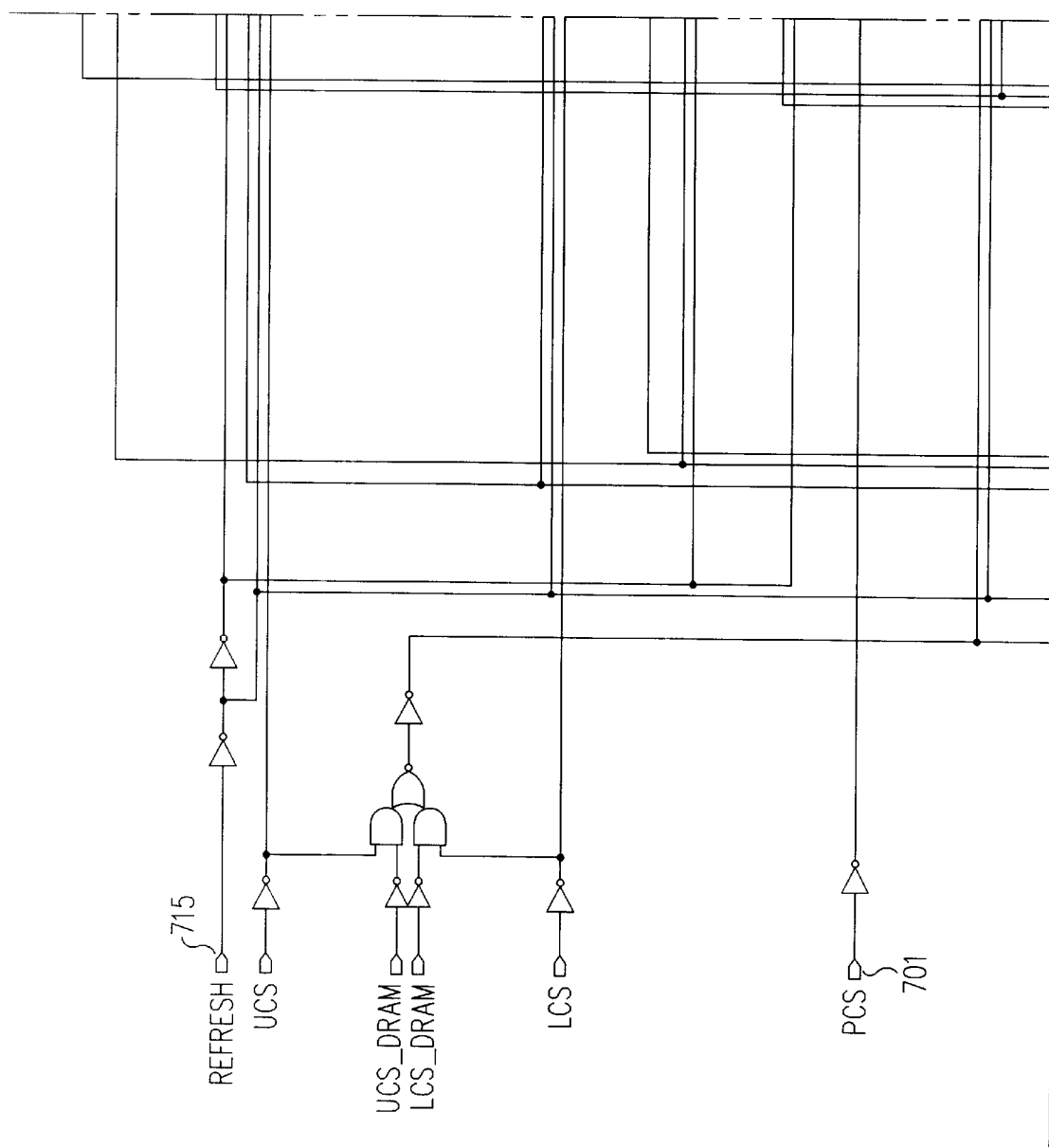
FIG. 7 (7A–7D) shows one implementation for suppressing $\overline{CAS}$.
Figure 7B:
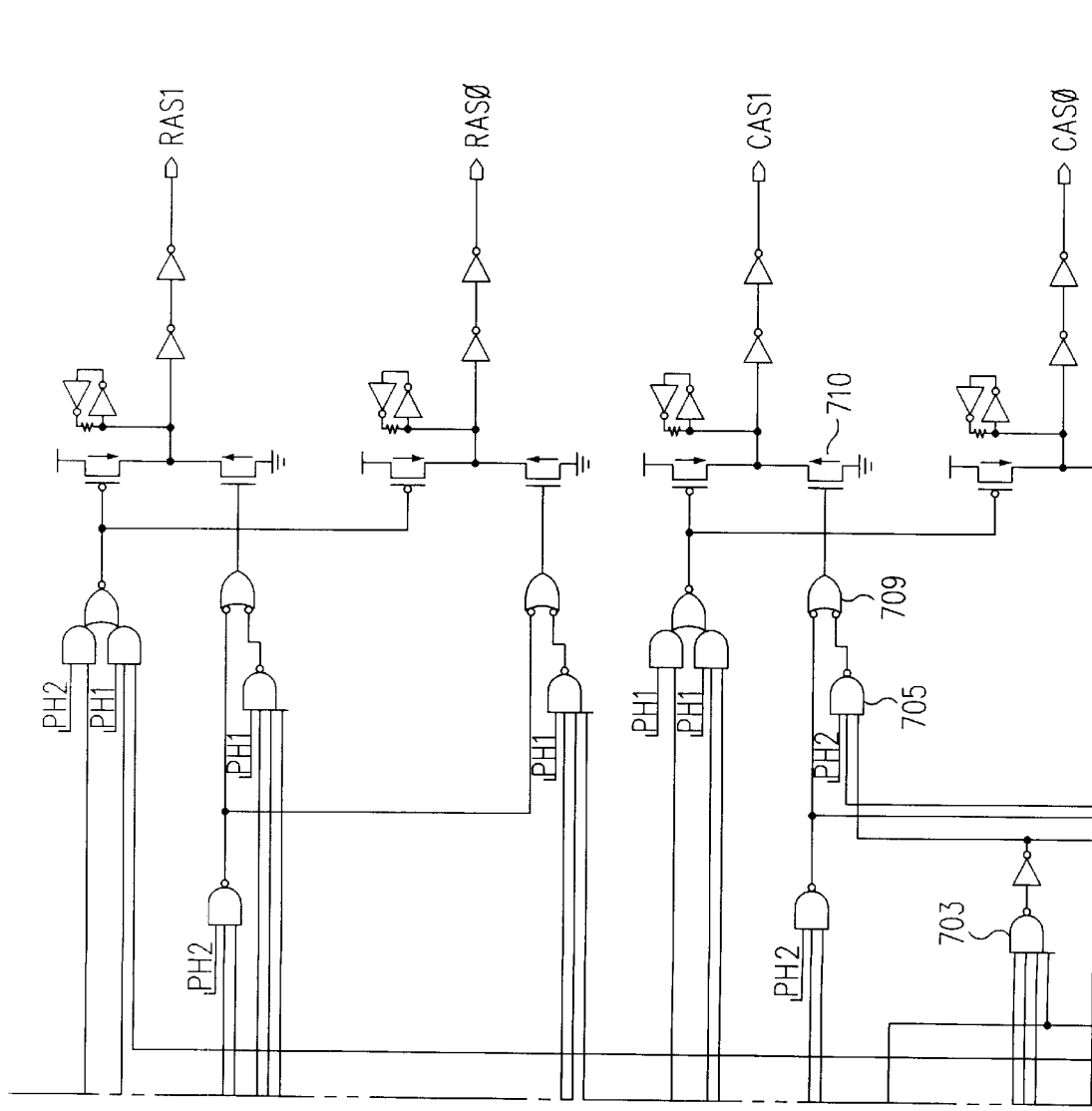
Figure 7C:
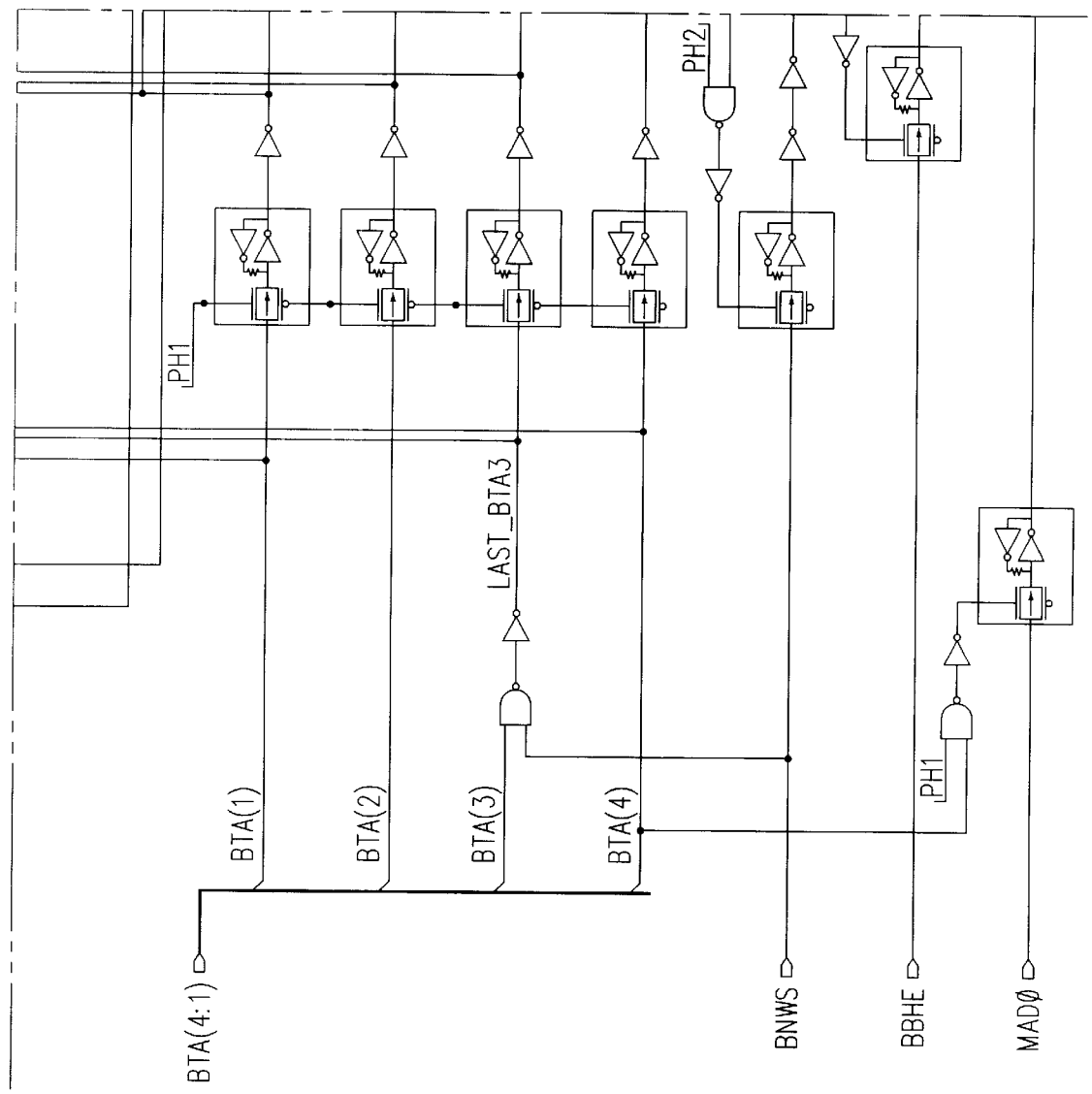

One way to suppress the $\overline{CAS}$ signal is shown in FIG. 7. PCS signal 701 is inverted and supplied to NAND gate 703. When PCS is asserted, NAND gates 703 is forced to 1, which forces NAND gates 705 and 707 to 1 which in turn prevents gates 709 and 710 (NAND gates equivalents), from turning on transistors 711 and 713 unless refresh signal 715 is asserted. Thus, assertion of PCS prevents assertion of $\overline{CAS}$. Note that $\overline{RAS}$ is not affected and is driven off the chip as if in the normal DRAM address space.

A PCS "hit" is determined by comparing the high order bits of the present address with the high order bits of the appropriate PCS base address. Such circuitry, not shown, is known in the art. Additionally, similar circuitry compares the address range to determine if there is a UCS or LCS "hit". Such circuitry requires a comparison of the high order bits of the address with the base address for UCS/LCS. Note that the number of high order bits to compare depends upon the block size selected for UCS or LCS, whichever is being compared.

In some implementations of microcontrollers, such as the AM186™ES, when a chip select is determined to be active, the chip select causes its ready and wait state programming to be placed onto an internal bus within the chip. The ready and wait states are communication protocols for the device and indicate how many wait states to insert, e.g., for a slow peripheral device to provide data on a read operation. The ready signal is a handshaking signal that indicates to the microcontroller to wait for an external ready signal before completing an access to a particular device. Different devices may have different communication protocols, i.e., different ready and wait states. If two chip selects are decoded in the same address space, e.g., LCS and PCS, the ready and wait state programming of both devices will be driven onto the internal bus causing contention and unpredictable behavior. Thus, it is necessary to not only suppress $\overline{CAS}$ externally when a PCS address is decoded, it is also necessary to ensure that the ready and wait states for only one device are provided on the internal bus.

Figure 8:
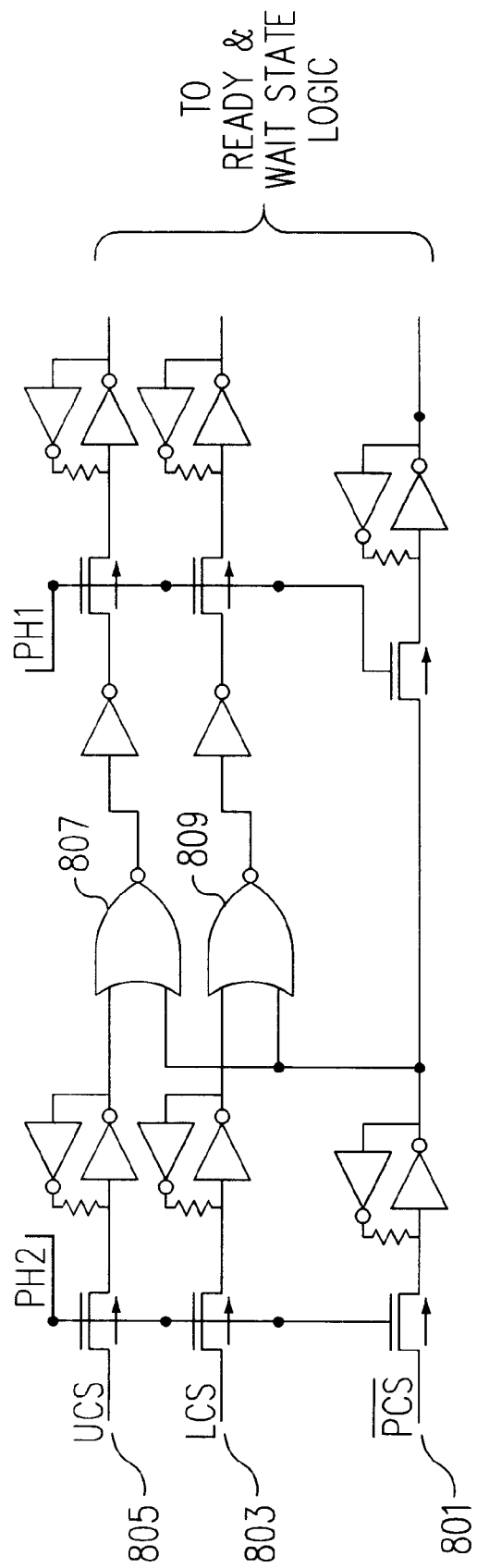
FIG. 8 shows one implementation of a priority resolving circuit.

That is accomplished in one embodiment as shown in FIG. 8. In FIG. 8, UCS and LCS are active high signals while PCS is an active low signal. PH1 and PH2 are non overlapping clock signals. When a PCS "hit" occurs, signal 801 is asserted. If either the LCS signal 803 or the UCS signal 805 and PCS is asserted, then gates 807 and 809 will respectively, turn the UCS and LCS signal off and prevent either from being supplied to the ready and wait state logic. Thus, the circuit in FIG. 8 functions as a priority resolution circuit and the priority is resolved in favor of the PCS signal. The PCS signal is then provided downstream to ready and wait state logic which provides the appropriate ready and wait state programming on the internal bus. Thus, if PCS is overlapped onto UCS or LCS address space, it is guaranteed that contention for ready and wait state programming will not take place.

The ready and wait state programming of the PCS device must be the same or slower than the DRAM. That is because if the PCS device is faster than the DRAM, it is possible that the $\overline{RAS}$ signal will be not asserted for the minimum time required thus causing an unpredictable reaction in the DRAM.

The description of the invention set forth herein is illustrative, and is not intended to limit the scope of the invention as set forth in the following claims. For instance, while the invention has been generally described in terms of a '186 microcontroller implementation, the invention is also applicable to other integrated circuits having chip selects and an embedded DRAM controller. Variations and modifications of the embodiments disclosed herein, may be made based on the description set forth herein, without departing from the scope and spirit of the invention as set forth in the following claims.

What is claimed is:

1. An integrated circuit comprising:
   means for accessing a DRAM in a first address range and outside of a second address range, the second address range being a subset of the first address range; and
   means for accessing a device in the second address range without causing an access to the DRAM; and
   means for selecting a communication protocol according to whether the memory access occurs in one of, the first address range outside of the second address range, and the second address range.

2. A processor comprising:
   a circuit receiving a first memory access indication signal, indicating that an address is in a first address range, the circuit asserting a column address strobe and a row address strobe according to the first memory access indication signal;
   an inhibiting circuit receiving a second memory access indication, indicating the address is in a second address range within the first address range, the inhibiting circuit preventing asserting the column address strobe when the second memory access indication is asserted; and
   a priority resolution circuit receiving the first and second memory access indication signals and inhibiting the first memory access indication signal on assertion of the second memory access indication signal.

3. The processor as recited in claim 2 wherein,
   the circuit receives a third memory access indication signal, indicating that an address is in a third address range, the circuit asserting a third address range column address strobe and a third address range row address strobe according to the third memory access indication signal; and wherein
   the inhibiting circuit prevents asserting the third address range column address strobe when the second memory access indication is asserted.

4. An apparatus comprising:
   a first address circuit receiving an address and asserting a first indication signal when the address is in a first address range designating an access to a DRAM;
   a second address circuit receiving the address and asserting a second indication signal when the address is in a second address range, the second address range designating an access to a first device, the second address range being a subset of and within the first address range;
   a memory interface circuit receiving the first and second indication signals and asserting a column address strobe when the first indication signal is asserted and the second indication signal is not asserted, the column address strobe being inhibited when the second indication signal is asserted;
   a first storage location indicating a number of wait states with which to communicate with the DRAM;
   a second storage location indicating whether a handshaking ready signal is required to communicate the DRAM;
   a third storage location indicating a number of wait states with which to communicate with the first device;
   a fourth storage location indicating whether a handshaking ready signal is required to communicate the first device; and
   a priority resolution circuit, receiving the first and second indication signal and resolving priority such that assertion of the second indication signal prevents providing an asserted first indication signal to the first and second storage locations.

5. A processing system comprising:
   a microcontroller including,
     a circuit receiving a first memory access indication signal, indicating that an address is in a first address range, the circuit asserting a column address strobe and a row address strobe according to the first memory access indication signal;

an inhibiting circuit receiving a second memory access indication, indicating the address is in a second address range within the first address range, the inhibiting circuit preventing assertion of the column address strobe when the second memory access indication is asserted;

a DRAM addressable in the first address range and coupled to receive the column address strobe and the row address strobe;

a peripheral device coupled to and selectable by the second memory access indication;

a first storage location indicating a number of wait states with which to communicate with the DRAM;

a second storage location indicating whether a handshaking signal ready signal is required to communicate the DRAM;

a third storage location indicating a number of wait states with which to communicate with the first device;

a fourth storage location indicating whether a handshaking ready signal is required to communicate the first device; and a priority resolution circuit, receiving the first and second indication signal and resolving priority such that assertion of the second indication signal prevents providing an asserted first indication signal to ready and wait state logic thereby preventing obtaining the number of wait states from the first storage location and prevents obtaining whether a handshake signal is required from the second storage location.

6. The processing system as recited in claim 5 wherein, the first memory access indication signal is one of an upper memory chip select signal and a lower memory chip select signal, and wherein the second memory access indication signal is a peripheral chip select signal.

7. The processing system as recited in claim 5 wherein the DRAM receives an asserted row address strobe when the address is in the first address range and when the address is in the second address range.

8. A method comprising the steps of:

accessing a DRAM in an address space that is in a first address range and outside of a second address range, the second address range being a subset of and within the first address range;

accessing another device in the second address range;

inhibiting a column address strobe to the DRAM when a memory access occurs in the second address range; and selecting a communication protocol of the other device in a priority resolution circuit when the memory access occurs in the second address range.

9. The method as recited in claim 8 further comprising the step of:

generating a row address strobe when a memory access occurs in the first address range and when the memory access occurs in the first and second address range.

10. The method as recited in claim 8 wherein the communications protocol includes a number of wait states to insert in accessing the second device.

11. The method as recited in claim 10 wherein the communications protocol includes whether to wait for an external ready signal.

12. The method as recited in claim 8 wherein the second address range is significantly smaller than the first address range.

13. A method comprising:

asserting a row address strobe when an address is within a first address range;

asserting a column address strobe when the address is within the first address range and outside of a second address range, the second address range being within the first address range;

inhibiting assertion of the column address strobe when the address is within the second address range; and selecting a communication protocol according to whether the memory access occurs in one of the first address range outside of the second address range and the second address range.

14. The method as recited in claim 13 wherein the steps are performed on a microcontroller.

15. The method as recited in claim 14 wherein the microcontroller is a '186 compatible microcontroller.

16. The method as recited in claim 13 wherein the row address strobe is asserted when the address is within the second address range.

17. A method comprising the steps of:

accessing a DRAM in an address space that is in a first address range and outside of a second address range, the second address range being a subset of and within the first address range;

accessing another device in the second address range; and selecting a communication protocol according to whether the memory access occurs in one of the first address range outside of the second address range and the second address range.

* * * * *